US006770321B2

(12) United States Patent
Hukari et al.

(10) Patent No.: US 6,770,321 B2
(45) Date of Patent: Aug. 3, 2004

(54) METHOD OF MAKING TRANSPARENT ARTICLES UTILIZING PROTECTIVE LAYERS FOR OPTICAL COATINGS

(75) Inventors: Kyle W. Hukari, Davis, CA (US); Peter A. Maschwitz, Sebastopol, CA (US); Rand D. Dannenberg, Benicia, CA (US)

(73) Assignee: AFG Industries, Inc., Kingsport, TN (US)

( * ) Notice: Subject to any disclaimer, the term of this patent is extended or adjusted under 35 U.S.C. 154(b) by 0 days.

(21) Appl. No.: 10/054,973

(22) Filed: Jan. 25, 2002

(65) Prior Publication Data

US 2003/0143401 A1 Jul. 31, 2003

(Under 37 CFR 1.47)

(51) Int. Cl.[7] .............................................. B65B 33/00
(52) U.S. Cl. ..................... 427/154; 427/164; 427/165; 427/255.394; 427/255.7; 204/192.1
(58) Field of Search ................................ 427/154, 164, 427/165, 255.394, 255.7, 166; 204/192.1

(56) References Cited

U.S. PATENT DOCUMENTS

| 4,112,142 A | * | 9/1978 | Schroder et al. ............. 427/166 |
| 4,702,955 A | * | 10/1987 | Allred et al. ................. 428/213 |
| 4,716,086 A | | 12/1987 | Gillery et al. |
| 4,786,563 A | | 11/1988 | Gillery et al. |
| 4,790,922 A | | 12/1988 | Huffer |
| 4,995,895 A | | 2/1991 | Groth et al. |
| 5,019,458 A | | 5/1991 | Elgat et al. |
| 5,190,807 A | | 3/1993 | Kimock et al. |
| 5,846,649 A | | 12/1998 | Knapp et al. |
| 6,101,085 A | * | 8/2000 | Kawahara et al. .......... 361/312 |
| 6,172,812 B1 | * | 1/2001 | Haaland et al. ............. 359/589 |
| 6,261,693 B1 | | 7/2001 | Veerasamy |
| 6,267,636 B1 | * | 7/2001 | Onishi et al. ................... 445/6 |
| 6,303,225 B1 | | 10/2001 | Veerasamy |
| 6,303,226 B2 | | 10/2001 | Veerasamy |
| 6,428,650 B1 | * | 8/2002 | Chung ........................ 156/250 |

FOREIGN PATENT DOCUMENTS

WO          WO 01/02496 A2      11/2001

* cited by examiner

*Primary Examiner*—Bret Chen
(74) *Attorney, Agent, or Firm*—Oblon, Spivak, McClelland, Maier & Neustadt, P.C.

(57) ABSTRACT

A method is provided for making transparent articles utilizing protective layers for optical coatings. An optical coating on a transparent substrate is provided with a temporary layer of carbon as protection during manufacturing against scratches and corrosive environments. When the optical coating and/or substrate are tempered in an atmosphere reactive to carbon, such as air, the layer of carbon is removed as a carbon-containing gas. For an optical coating with a brittle, glassy, outermost layer furthest from the substrate, additional protection is provided by a scratch propagation blocker layer between the outermost layer and the carbon protective layer.

34 Claims, 6 Drawing Sheets

METHOD OF MAKING TRANSPARENT ARTICLES UTILIZING PROTECTIVE LAYERS FOR OPTICAL COATINGS

BACKGROUND OF THE INVENTION

1. Field of the Invention

This invention relates to protective layers applied to optical coatings on transparent substrates. In particular, the invention relates to the use of a temporary protective layer of carbon. In addition, the invention relates to a scratch propagation blocker (SPB) protective layer applied to the outermost layer of various optical coatings.

2. Discussion of the Background

Optical coatings are deposited on transparent substrates to reflect or otherwise alter the transmission of some or all of the radiation incident on the substrates. For example, the optical coating of a mirror is designed to reflect visible light. Low-emissivity optical coatings are designed to reduce the transmission of infrared radiation. Optical coatings generally include two or more different layers each having a thickness in a range of from less than 1 nm to over 500 nm.

Optical coatings are frequently damaged during shipping and handling by scratching and by exposure to corrosive environments. Silver based low-emissivity coatings in particular have been plagued with corrosion problems since their introduction into the fenestration marketplace decades ago. Attempts at improving the durability of optical coatings have included the application of a temporary protective layer such as a plastic adhesive backed film. Other protective layers have been formed by applying and curing solvent based polymers on glass.

However, a number of problems are associated with using adhesive films and polymer films as protective layers on optical coatings. Expensive, specialized equipment is required to apply the adhesive films and the polymer films to optical coatings. When an adhesive film is pulled away from an optical coating, the adhesive film runs the risk of removing portions of the optical coating. Even if portions of the optical coating are not removed, the force on the optical coating associated with removing the adhesive film can damage the optical coating. A solvent based polymer film applied to an optical coating must be dried and the solvent removed in an environmentally friendly manner. Removal of the polymer film from an optical coating requires specialized washing that can easily damage the optical coating.

For protection from corrosion, most silver based low-emissivity stacks in use today make use of barrier or cladding layers in direct contact and on one or both sides of the silver layers. It is well known in the art that various thin film layers can function as barriers to movement of corrosive fluids such as water vapor and oxygen. Metals layers are known to be particularly effective diffusion barriers due to their ability to physically and chemically inhibit diffusion of corrosive fluids. Metal layers tend to be more effective physical barriers to diffusion than dielectric layers such as oxides, because both evaporated and sputtered metal layers tend to contain fewer pinhole defects than oxide layers. Metal layers also tend to chemically block diffusion by reacting with fluids diffusing through a pinhole to stop the movement of all chemically bound fluid molecules. The bound fluid molecules in turn restrict the passage of additional fluid through the pinhole. The more reactive metals are particularly effective for chemically blocking.

Tempering greatly reduces the corrosion problems associated with silver based low-emissivity coatings. Tempering results in an atomic level restructuring to a lower energy state and renders the silver far less prone to corrosion. Tempering also improves the hardness and scratch resistance of optical coatings.

However, until optical coatings are tempered, the coatings remain particularly susceptible to damage from scratching and corrosion. Even after tempering, optical coatings are not immune from scratching and corrosion.

Scratches in an optical coating frequently do not become visible until after the coating is heated and tempered, which can cause the scratches to grow and propagate.

Carbon has been used as a protective coating on glass substrates. For example, U.S. Pat. No. 6,303,226 discloses the use of an amorphous, diamond-like carbon (DLC), protective layer on a glass substrate.

There is a need for improved methods and layers for protecting optical coatings.

SUMMARY OF THE INVENTION

The present invention provides a method of making a transparent article with a reduced number of scratches and other surface defects. The transparent article includes a optical coating on a transparent substrate. According to the invention, a protective coating is formed on the optical coating that improves the durability and scratch resistance of the optical coating, particularly during manufacturing.

The protective coating can include a layer consisting essentially of carbon. The carbon protective layer is formed on the optical coating before tempering. During shipping and handling of the untempered optical coating, the carbon layer serves as a low friction, protective layer against scratches. Heating and tempering the optical coating and/or transparent substrate in an atmosphere reactive to carbon consumes the carbon protective layer, thus eliminating any scratches or other surface defects in the carbon. The carbon protective layer is converted into a carbon containing gas, leaving behind a relatively scratch-free optical coating.

The protective coating can also include a thin protective layer of a scratch propagation blocker (SPB) material. The SPB material inhibits the propagation of scratches into the brittle, glassy, outermost layer of various optical coatings during tempering. SPB materials such as Ti, Si, Zn, Sn, In, Zr, Al, Cr, Nb, Mo, Hf, Ta and W, and oxides and nitrides thereof, are suitable for use on an outermost layer of silicon nitride (e.g., $Si_3N_4$). The SPB layer can be formed by depositing on the outermost layer of an optical coating a diffusion barrier layer of at least one metal, metal sub-oxide or metal sub-nitride of Ti, Si, Zn, Sn, In, Zr, Al, Cr, Nb, Mo, Hf, Ta or W; and then reacting the diffusion barrier layer with an oxygen containing atmosphere such as air to form a metal oxide SPB layer including at least one of $TiO_2$, $SiO_2$, ZnO, $SnO_2$, $In_2O_3$, $ZrO_2$, $Al_2O_3$, $Cr_2O_3$, $Nb_2O_5$, $MoO_3$, $HfO_2$, $Ta_2O_5$ and $WO_3$. The SPB layer can be used with or without a carbon protective layer on the SPB layer.

Use of the temporary carbon protective layer when manufacturing a transparent article having an optical coating significantly reduces the number and severity of scratches introduced into the optical coating by the manufacturing process. Because the carbon layer is removed during tempering, the carbon layer does not affect the optical properties of the optical coating. While the SPB layer is not removed during tempering and may affect the optical properties of an optical coating, the SPB layer, by inhibiting scratch propagation, is particularly useful in protecting a brittle, glassy, outermost layer of an optical coating from the formation of visible scratches. A metal, metal sub-oxide or metal sub-nitride layer is particularly useful in providing corrosion protection before tempering and can be converted by tempering in an atmosphere containing oxygen to a metal oxide SPB layer that is essentially transparent to visible light.

BRIEF DESCRIPTION OF THE DRAWINGS

The preferred embodiments of this invention will be described in detail with reference to the following figures.

DETAILED DESCRIPTION OF PREFERRED EMBODIMENTS

The present invention provides a protective coating on an optical coating deposited on a transparent substrate to inhibit the formation of scratches on and corrosion of the optical coating.

The transparent substrate can be a plastic or a glass. Preferably, the transparent substrate is a glass that can be tempered by heating and quenching.

In embodiments, the protective coating includes a carbon protective layer. Carbon is a classic low-friction material. Even if an abrasive succeeds in initially scratching carbon, the abrasive often becomes coated with carbon. Subsequent contact between the carbon coated abrasive and carbon is characterized by one of the lowest coefficients of friction, $\mu_{static} \approx \mu_{kietic} = 0.1$ to 0.2. Thus, the carbon coated abrasive tends to slide off of the carbon, doing no further damage to the carbon. Carbon is also inert in many corrosive environments and exhibits good resistance to alkalies and most acids. Thus, a carbon layer on an optical coating can protect the optical coating from scratches and environmental corrosion during handling.

Figure 1A:
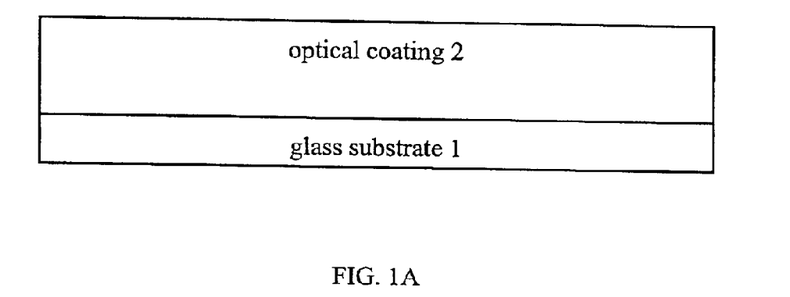
FIGS. 1A–1C show the deposition of a carbon protective layer on an optical coating on a glass substrate and the subsequent removal of the carbon protective layer.
Figure 1B:
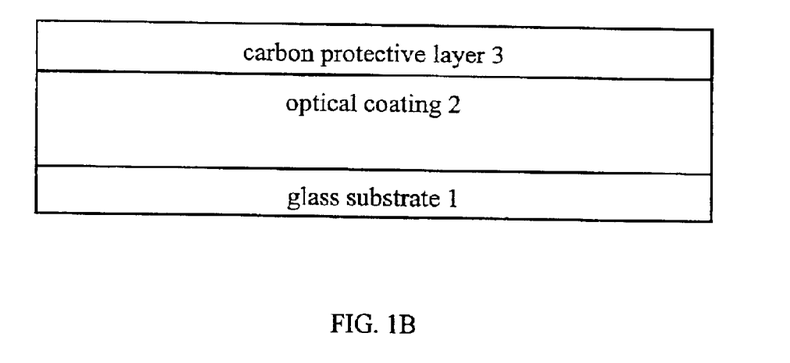
Figure 1C:
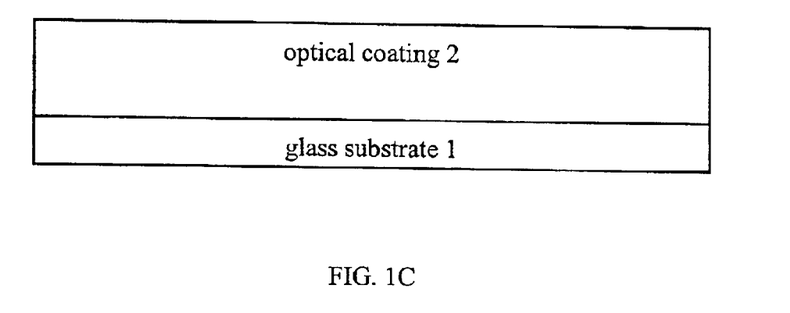

FIGS. 1A–1C illustrate embodiments of the invention in which a temporary carbon layer is formed on an optical coating to protect the optical coating from scratching and environmental corrosion during manufacturing. FIG. 1A shows a glass substrate 1 coated with an optical coating 2. FIG. 1B shows that to protect the optical coating from scratches and environmental corrosion during shipping and handling, a carbon protective layer 3 is deposited on the optical coating 2. FIG. 1C shows that after tempering the optical coating 2 and/or the glass substrate 1 at elevated temperatures in an atmosphere reactive to carbon, the carbon protective layer 3 is converted into a carbon containing gas, eliminating any scratches or other defects that had been present in the carbon protective layer 3.

The carbon protective layer is a layer consisting essentially of carbon. The term "consisting essentially of", while not excluding unavoidable impurities, excludes other unspecified elements and compounds that would be left behind as a solid residue when the carbon is reacted to completion with a reactive atmosphere to form a carbon containing gas. In embodiments, the carbon layer consists of carbon and unavoidable impurities.

The carbon layer can be deposited on the optical coating by a vapor deposition process. Techniques and processes for vapor depositing carbon are well known in the art. Suitable vapor deposition processes include evaporation and plasma deposition processes such as plasma chemical vapor deposition, ion implantation and sputtering. The sputtering can be DC or RF. An inert gas such as Ar, with or without small amounts of additional gases such as hydrogen and nitrogen, can be used in the plasma deposition processes to form the carbon layer. The presence of 1 to 10% nitrogen in the inert gas favors the deposition of graphitic carbon. The nitrogen in the inert gas can be used to dope the carbon with nitrogen.

The carbon layer can include one or more phases of carbon, such as graphite, diamond and amorphous phases of carbon. The carbon layer can also include diamond-like carbon. The carbon in graphite has sp2 bonding. The carbon in diamond has sp3 bonding. Amorphous carbon generally includes both sp2 and sp3 bonding, but has no long range order. Diamond-like carbon also includes both sp2 and sp3 bonding, and exhibits a hardness resembling that of diamond.

The carbon layer can be from 1 to 10 nm thick. A carbon layer less than 1 nm thick does not provide adequate scratch resistance. A carbon layer more than 10 nm thick becomes difficult to remove completely in a atmosphere reactive to carbon.

The reactive atmosphere used to convert the carbon protective layer into a carbon containing gas can include various gases known in the art to be reactive with carbon. For example, the reactive atmosphere can include hydrogen, which can convert the carbon into methane gas. A halogen, such as fluorine or chlorine, can be used to form at elevated temperatures a tetrahalomethane gas such as $CF_4$ or $CCl_4$. Oxygen in a reactive atmosphere can be used to form carbon monoxide and carbon dioxide gases. Because optical coatings and glasses generally contain various oxides that are inert in oxygen, the atmosphere reactive with carbon preferably contains oxygen. Because air, which contains $O_2$, is inexpensive and readily available, more preferably the reactive atmosphere is air.

Tempering is a process which involves heating a material to elevated temperatures and then quenching. Tempering is known to significantly increase the strength and toughness of glass and of optical coatings on glass. Glass can be tempered by heating to a temperature in the range of 400 to 650° C. followed by quenching to room temperature. Optical coatings including Ag layers can be tempered by heating to a temperature in a range below the 960° C. melting point of Ag followed by quenching to room temperature. For example, a low-emissivity optical coating including an Ag layer can be tempered by heating to about 730° C. for a few minutes following by quenching. Preferably, the glass and optical coatings are tempered at a temperature of at least 400° C. In embodiments of the invention, both the glass and the optical coating are tempered in an oven held at an elevated temperature. In other embodiments, to avoid having to heat the entire mass of the glass, only the optical coating is tempered. For example, instead of being heated in an oven, the optical coating can be heated by a flame or high intensity lamp to a temperature sufficient to both temper the optical coating and burn away the protective carbon layer.

Thus, tempering an optical coating covered with a carbon protective layer in an atmosphere reactive with carbon can cause the carbon to form a carbon containing gas and leave the surface of the optical coating. Any scratches in the carbon layer disappear along with the carbon layer. Preferably, the reactive atmosphere tempering removes all of the carbon protective layer from the optical coating.

The carbon protective layer can protect an optical coating from scratches caused during the manufacture of the coating by, e.g., shipping and handling. In addition, the carbon protective layer can protect an optical coating from corrosive environments that might develop when the optical coating with the carbon protective layer is stored in air for one or more days or is washed. Preferably, the number of scratches in the optical coating immediately after the carbon protective layer is removed is no more than 110% of the number of scratches in the optical coating immediately before the carbon was deposited on the optical coating.

In embodiments of the present invention, between the carbon protective layer and the optical coating, an SPB layer can be formed. Preferably, the SPB layer has a uniform composition and is homogeneous throughout. An SPB layer is made from a material having the property of inhibiting during tempering the propagation of scratches and cracks into the outermost layer of an optical coating. Different outermost layers require different materials in an SPB layer. The material forming the SPB layer should be less brittle and glass-like than the outermost layer of the optical coating. Preferably, the fracture toughness of the SPB material is higher than that of the outermost layer.

Figure 2:
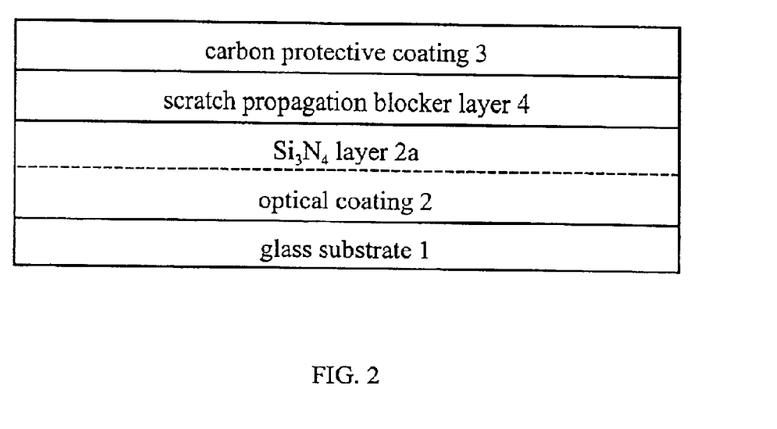
FIG. 2 shows a glass substrate coated with an optical coating, a scratch propagation blocker layer and a carbon protective layer.

FIG. 2 shows embodiments of the invention in which a SPB layer 4 is sandwiched between a carbon protective layer 3 and an outermost $Si_3N_4$ layer 2a of an optical coating 2. Both the SPB layer 4 and the carbon protective layer 3 provide scratch protection to the optical coating 2. In particular, the SPB layer 4 inhibits the propagation of scratches in the carbon protective layer 3 down to and into the $Si_3N_4$ layer 2a.

Preferably the silicon nitride outermost layer has a uniform composition and is homogeneous throughout.

An outermost layer of amorphous silicon nitride (e.g., amorphous $Si_3N_4$) is preferred in an optical coating on glass subject to tempering. Amorphous silicon nitride does not undergo a phase change upon heating to the temperatures necessary to temper glass. Furthermore, the density of amorphous silicon nitride is the same before and after the tempering, so the tempering does not leave stresses at the interface of the silicon nitride and the rest of the optical coating that could lead to delamination.

The amorphous silicon nitride also inhibits the formation of haze in the optical coating. Haze develops when materials mix together to form a two phase system causing the index of refraction to vary as a function of position throughout a layer. Because the phase stability of silicon nitride prevents mixing, the haze in optical coatings with an outermost silicon nitride is low after tempering.

Since the silicon nitride remains amorphous, there is less atomic motion at the interfaces between layers of the optical coating than there would be if there were a phase change, which results in better retention of the initial adhesion between layers.

A problem with an outermost layer of amorphous silicon nitride in an optical coating is that the covalent bonding and amorphous structure of the silicon nitride results in a stiff material with crack propagation properties similar to those of glass. Small cracks propagate easily through stiff, glassy materials.

Figure 3:
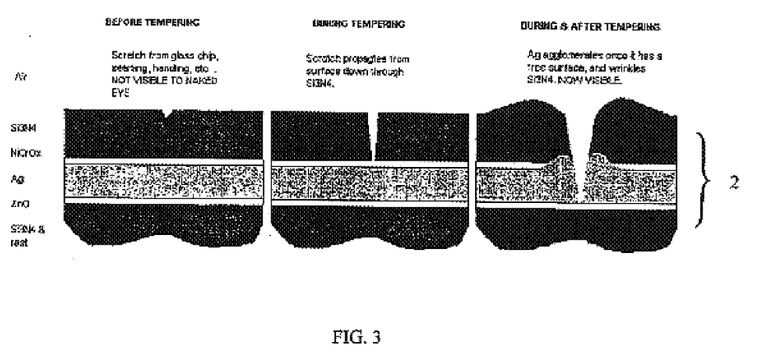
FIG. 3. shows the propagation of a scratch through a layer of $Si_3N_4$.

FIG. 3 illustrates a possible mechanism by which cracks can propagate through an optical coating 2 having an outermost layer of silicon nitride. Initially small scratches are shallow and not detectable by the "naked eye" inspection methods used on most tempering lines. This is because the scratches do not penetrate completely through the outermost silicon nitride. However, upon heating the small cracks propagate through the silicon nitride to underlying layers of, e.g., Ag. Once exposed by the crack, the Ag can agglomerate at its unconstrained surface. When the Ag agglomerates, the crack becomes visible and the part must be rejected.

In the embodiments shown in FIG. 2, cracks in tempered optical coatings with silicon nitride outermost layers are minimized by depositing before tempering an SPB layer on the silicon nitride and a C layer on the SPB layer. The same sputtering equipment can be used to deposit the SPB/C combination and the optical coating onto glass.

As discussed above, carbon provides a classic low-friction surface. Even when an abrasive initially scratches carbon, the abrasive becomes coated with carbon, leading to carbon-on-carbon sliding with extremely low friction.

If an abrasive succeeds in puncturing the protective carbon layer, then the abrasive will encounter the SPB layer. However, most scratches or cracks formed by the abrasive will not propagate through the SPB layer upon tempering. Although, unlike the carbon protective layer, the SPB layer remains after tempering, most scratches in the SPB remain invisible to the naked eye.

Suitable materials for forming an SPB layer include metals such as Ti, Si, Zn, Sn, In, Zr, Al, Cr, Nb, Mo, Hf, Ta and W; oxides of these metals; and nitrides of these metals.

The term "oxides" as used herein includes stoichiometric oxides; superoxides, containing more than a stoichiometric amount of oxygen; and suboxides, containing less than a stoichiometric amount of oxygen. The term "metal suboxide" as used herein includes metals doped with small amounts, e.g, 0.1–10 atomic %, of oxygen.

The term "nitrides" as used herein includes stoichiometric nitrides; supernitrides, containing more than a stoichiometric amount of nitrogen; and subnitrides, containing less than a stoichiometric amount of nitrogen. The term "metal subnitride" as used herein includes metals doped with small amounts, e.g., 0.1–10 atomic %, of nitrogen.

Suitable stoichiometric oxides for forming an SPB layer include $TiO_2$, $SiO_2$, ZnO, $SnO_2$, $In_2O_3$, $ZrO_2$, $Al_2O_3$, $Cr_2O_3$, $Nb_2O_5$, $MoO_3$, $HfO_2$, $Ta_2O_5$, $WO_3$. Suitable stoichiometric nitrides for forming an SPB layer include TiN. $TiO_2$ in particular is very good at inhibiting scratches. The SPB layer can be formed by vapor deposition techniques known in the art.

The SPB layer can be from 2 to 8 nm thick. When the SPB layer is a stoichiometric oxide or nitride, the SPB layer is preferably from 2 to 8 nm, more preferably from 3 to 6 nm, thick. When the SPB layer is a metal, the SPB layer is preferably from 4 to 8 nm, more preferably from 4 to 6 nm, thick. If the stoichiometric oxide or nitride SPB layer is thinner than 2 nm, or the metal SPB layer is thinner than 4 nm, then the SPB material exhibits a decreased tendency to inhibit the propagation of scratches. There is little advantage to an SPB layer thickness of greater than 8 nm, because the scratch propagation inhibition resulting from the SPB layer saturates at a thickness of about 8 nm and the influence of the SPB layer on the optical characteristics of an optical coating, which must be taken into account, increases with SPB layer thickness. However, as discussed below, metals, metal suboxides and metal subnitrides can be used as diffusion barrier layers greater than 2 nm thick that, after being oxidized during tempering, can form metal oxide SPB layers that can be substantially invisible.

As discussed above, in embodiments the SPB layer can be combined with a carbon protective layer on top of the SPB layer. In other embodiments, the SPB layer can form the only protective layer on an optical coating. An SPB layer can help to prevent scratching and scratch propagation on handling, even without a protective carbon layer.

In embodiments of the invention, the SPB layer can be formed by oxidizing a diffusion barrier layer used to provide corrosion protection to an optical coating before tempering. The diffusion barrier layer is a metal, metal suboxide or metal subnitride material including an metal element selected from Ti, Si, Zn, Sn, In, Zr, Al, Cr, Nb, Mo, Hf, Ta and W. The diffusion barrier layer is deposited on the outermost layer of an optical coating before tempering the optical coating. Tempering the optical coating in an atmosphere containing oxygen converts the diffusion barrier layer into a metal oxide SPB layer. Preferably, the diffusion barrier layer contains Ti, Zr or Al, which upon heating in air can be converted to SPB layers of the metal oxides $TiO_2$, $ZrO_2$ or $Al_2O_3$, respectively. Preferably, the metal suboxide contains about 80% or less of the oxygen present in the most fully oxidized stoichiometric oxide of the metal. Metal suboxide films deposited with about 80% or less of full oxidation tend to form better diffusion barriers than films reactively deposited with more than about 80% of full oxidation.

As discussed above, metal layers are known to be particularly effective barriers to diffusive movement of corrosive fluids. Metals suboxides and metal subnitrides function similarly to metals as diffusion barriers. Metal suboxides and metal subnitrides tend to form dense layers when sputtered or evaporated and chemically inhibit diffusion of oxygen and water vapor to a greater extent than the corresponding fully oxidized metals.

Metal suboxides and metal subnitrides can be formed by vapor deposition methods known in the art. For example, metal suboxides and metal subnitrides can be formed by vapor depositing a metal in an atmosphere containing a controlled amount of oxygen and nitrogen.

Metal suboxides and subnitrides tend to be optically absorbing and reduce visible transmission of an optical coating until they are heated and reacted to a fully oxidized state.

The bonding between nitrogen and metal in a metal subnitride is typically not as strong as the bonding between oxygen and metal in a metal suboxide. Heating a metal subnitride in an atmosphere containing oxygen will generally convert the metal subnitride to the corresponding metal oxide or at least to a metal oxynitride that is substantially transparent.

The diffusion barrier layer can be between about 4 and 8 nm thick, preferably between 4 and 6 nm thick. Typically, reactive metal layers will fully oxidize in room temperature air if the metal is 2 nm or less in thickness. Thicker metal layers will often oxidize to a depth of 2 nm while the remainder of the layer remains metallic. The oxidation process can be driven deeper if the metal is exposed to an energy source such as heat or a more chemically reactive environment than air. In embodiments of the invention, the diffusion barrier layer is deposited thicker than the thickness which allows complete oxidation in room temperature air. In this way, the layer remains metallic and functions as an effective corrosion barrier prior to tempering. To provide the scratch propagation resistance discussed above before oxidation, preferably the diffusion barrier layer is deposited to a thickness of 4 nm or more. To ensure that the diffusion barrier layer is fully oxidized during the tempering process, the diffusion barrier layer is deposited to a thickness of 8 nm or less, preferably 6 nm or less.

When a metal, metal suboxide or metal subnitride layer 4 to 6 nm thick is fully oxidized, it tends to have little optical effect on the optical stack. Because metal oxides are more transparent to visible light than metals, metal suboxides and metal subnitrides, fully oxidizing the diffusion barrier layer results in a metal oxide SPB layer that is effectively optically invisible.

Using the tempering process to form a metal oxide SPB layer from a diffusion barrier on a temperable low-emissivity optical coating both protects the coating from corrosion before tempering and eliminates many undesirable optical effects associated with having a diffusion barrier layer as the SPB layer on the low-emissivity optical coating after tempering.

In further embodiments, a carbon layer can be deposited onto the diffusion barrier layer on the temperable low-emissivity optical coating as additional protection for the optical coating. Tempering the optical coatings by heating in air can then both burn away the carbon layer and convert the diffusion barrier layer into a transparent metal oxide SPB layer.

Figure 4A:
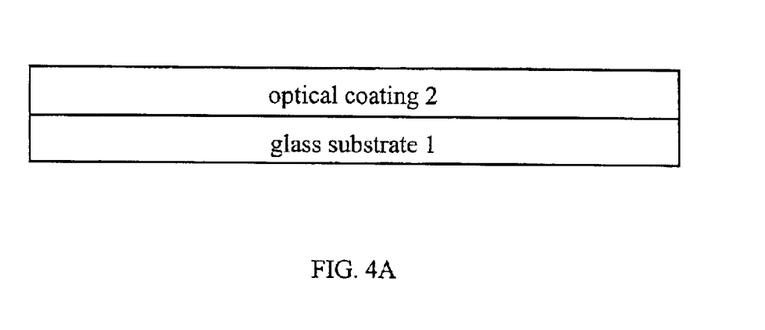
FIGS. 4A–4C show the deposition of a metal layer on an optical coating on a glass substrate and the subsequent conversion of the metal layer to a metal oxide scratch propagation blocker layer.
Figure 4B:
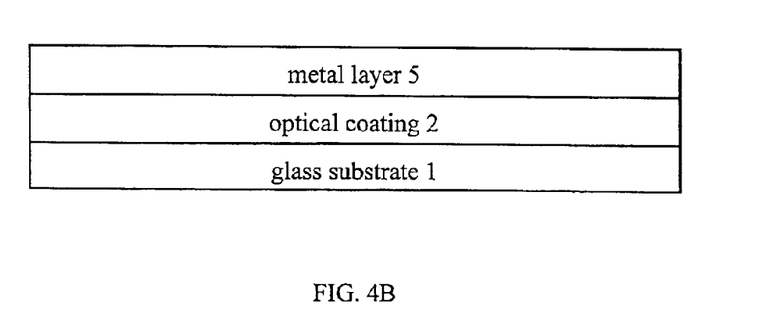
Figure 4C:
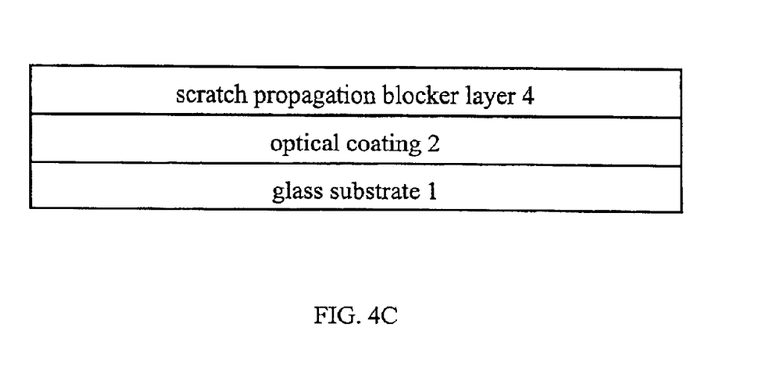

FIGS. 4A–4C illustrate embodiments of the invention in which a metal oxide SPB layer is formed by depositing a metal layer onto an optical coating and then reacting the metal in an atmosphere containing oxygen to form the oxide. FIG. 4A shows a glass substrate 1 provided with an optical coating 2. FIG. 4B shows a metal layer 5 deposited on the optical coating 2. FIG. 4C shows that upon heating the metal layer 5 in an atmosphere containing oxygen, such as air, the metal layer 5 is converted to a metal oxide scratch propagation blocker layer 4.

EXAMPLES

The following examples are intended to illustrate the invention further but not to limit the field of use as defined in the attached patent claims.

Example 1

Figure 5:
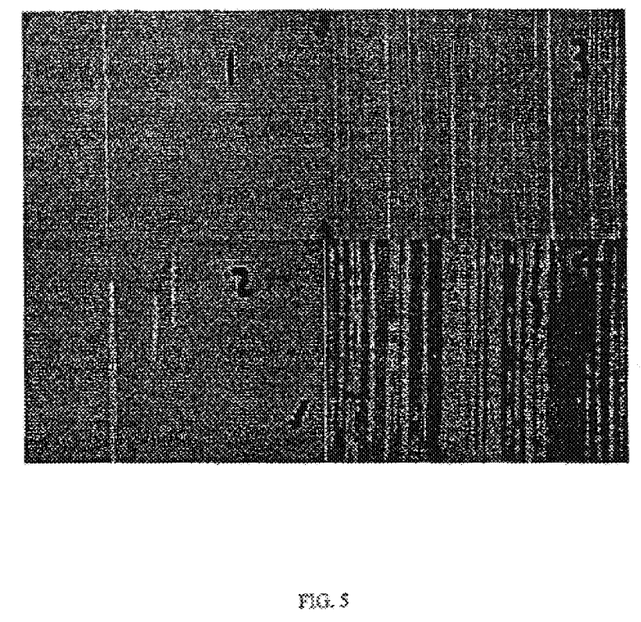
FIG. 5 compares glass substrates, having the same optical coating but with and without a carbon protective layer, when scratched.

FIGS. 5(1)–5(4) are optical microscope photographs showing the significant decrease in scratches that results according to the present invention by depositing a temporary carbon protective layer on an optical coating before tempering, and then removing the carbon protective layer by tempering in a reactive atmosphere. Each sample had the same optical coating. The optical coating included multiple layers of Zn, Ag, and NiCr, along with an outermost layer of 36 nm thick Si. A carbon protective layer 1 nm thick was deposited on the optical coatings of the samples shown in FIGS. 5(1) and 5(2), but not on the optical coatings of the samples shown in FIGS. 5(3) and 5(4). The samples were then scratched under the same conditions using the same commercial abrasion wheel (a TABER® wheel). FIGS. 5(1) and 5(2) show different areas of carbon protected samples representative of the worst scratching. The scratch in FIG. 5(1) is about 10–15 nm wide. FIGS. 5(1) and 5(3) show scratched samples before tempering. FIGS. 5(2) and 5(4) show scratched samples after tempering in air at 730° C. for four minutes. During the tempering in air, the width of the scratches roughly doubled. The carbon protective layer on the sample shown in FIG. 5(2) burned away during the tempering along with most of the scratches.

FIG. 5 shows that the presence of a carbon protective layer on an optical coating before tempering greatly reduces the number of scratches appearing on the optical coatings after tempering in air when the carbon layer has burned away.

Example 2

Figure 6:
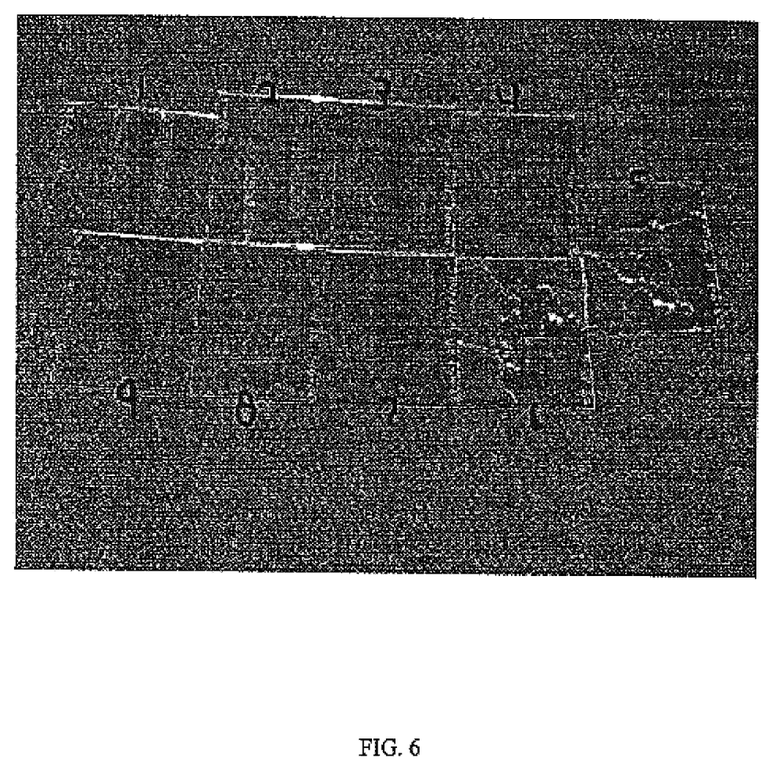
FIG. 6 compares glass substrates, having the same optical coating but with and without a carbon protective layer, when scratched.

FIG. 6 shows nine samples (numbered 1 through 9) comparing the effect of different carbon protective layer thicknesses on scratches remaining on optical coatings after tempering. Each sample had the same optical coating. The optical coating included multiple layers of Zn, Ag, and NiCr, along with an outermost layer of 36 nm thick Si. Carbon protective layers of various thicknesses were deposited on the samples as shown in the following Table 1. Samples 1–2 contained no carbon protective layer.

TABLE 1

| SAMPLE | CARBON THICKNESS (nm) |
| --- | --- |
| 1 | none |
| 2 | none |
| 3 | 1 |
| 4 | 1.2 |
| 5 | 1.8 |
| 6 | 5 |
| 7 | 5 |
| 8 | 10 |
| 9 | 15 |

The samples were scratched under the same conditions using the same commercial abrasion wheel (a TABER® wheel). The nine samples were each tempered in air at 730° C. for four minutes. FIG. 6 shows Samples 1–9 after the tempering.

As shown in FIG. 6, Samples 3–9, which included temporary carbon protective layers, had significantly fewer scratches after tempering in air than did Samples 1–2, which did not include carbon protective layers. The color of Samples 3–8 after tempering was the same as the color of Samples 1–2 before tempering, indicating that the carbon layer on Samples 3–8 was completely removed. A trace of carbon remained on Sample 9 after the tempering.

Example 3

Individual protective layers of various SPB materials and carbon were deposited onto identical optical coatings on glass. The protective layers were scratched under the same conditions using the same commercial abrasion wheel (a TABER® wheel). Table 2 shows the relative abilities of individual SPB materials and of carbon to lessen scratch damage.

TABLE 2

| PROTECTIVE LAYER (SPB or C) | THICKNESS (nm) | DAMAGE (%) |
| --- | --- | --- |
| unprotected (standard) | — | 100 |
| SiO$_2$ | 2 | 60 |
| TiN | 2 | 30 |
| TiO$_2$ | 2 | 30 |
| ZnO | 2 | 10 |
| C | 1 | 10 |
| C | 10 | 2 |

In Table 1, the "% Damage" is the approximate number of scratches per unit length perpendicular to the direction of the abrasive tool.

Table 2 shows that an SPB layer can help to prevent scratching and scratch propagation on handling, even without a protective carbon layer. Combined, the SPB and C layers can have an even greater effect in inhibiting scratches. The thicknesses of each SPB and C layer can be varied as needed.

Example 4

Zr layers of different thicknesses are deposited onto identical silver based low-emissivity optical coatings on glass substrates. The Zr coated optical coatings are exposed to room temperature air having a relative humidity of 80% for 24 hours. The optical coatings are then tempered at 730° C. in air. Zr layers 2 nm and 3 nm thick are found to provide no corrosion protection to the silver based low-emissivity coatings. In contrast, Zr layers 4 nm and 8 nm thick are found to provide substantial corrosion protection to the silver based low-emissivity coatings.

While the present invention has been described with respect to specific embodiments, it is not confined to the specific details set forth, but includes various changes and modifications that may suggest themselves to those skilled in the art, all falling within the scope of the invention as defined by the following claims.

What is claimed is:

1. A method of making a transparent article, the method comprising forming a protective coating including a layer consisting essentially of carbon on an optical coating on a substrate;

heating the protective coating in a reactive atmosphere;

reacting the layer consisting essentially of carbon with the reactive atmosphere to form a carbon containing gas; and removing the layer consisting essentially of carbon from the optical coating to form the transparent article.

2. The method according to claim 1, wherein the forming comprises vapor depositing the protective coating.

3. The method according to claim 2, wherein the vapor depositing comprises sputtering.

4. The method according to claim 1, wherein before the heating the layer consisting essentially of carbon is 1 nm to 10 nm thick.

5. The method according to claim 1, wherein the layer consisting essentially of carbon is doped with nitrogen.

6. The method according to claim 1, wherein the layer consisting essentially of carbon consists of carbon and unavoidable impurities.

7. The method according to claim 1, wherein the carbon in the layer consisting essentially of carbon comprises at least one form of carbon selected from the group consisting of diamond-like carbon and graphite.

8. The method according to claim 1, wherein the reactive atmosphere is an atmosphere containing oxygen.

9. The method according to claim 8, wherein the atmosphere containing oxygen is air.

10. The method according to claim 1, wherein the carbon containing gas comprises at least one compound selected from the group consisting of carbon monoxide and carbon dioxide.

11. The method according to claim 1, wherein the heating comprises raising a temperature of the protective coating to at least 400° C.

12. The method according to claim 1, wherein the heating tempers the optical coating.

13. The method according to claim 1, wherein the heating tempers the substrate.

14. The method according to claim 1, wherein the substrate comprises a glass.

15. The method according to claim 14, wherein the glass is transparent to visible light.

16. The method according to claim 1, wherein the reacting removes all of the layer consisting essentially of carbon from the optical coating.

17. The method according to claim 1, wherein a number of scratches in the optical coating after the removing is no more than 110% of a number of scratches in the optical coating immediately before the forming.

18. The method according to claim 1, wherein the optical coating includes furthest from the substrate a homogeneous outermost layer comprising silicon nitride.

19. The method according to claim 18, wherein the protective coating further includes a scratch propagation blocker layer between the layer consisting essentially of carbon and the outermost layer; and the scratch propagation blocker layer is a homogeneous layer comprising a material selected from the group consisting of Ti, Si, Zn, Sn, In, Zr, Al, Cr, Nb, Mo, Hf, Ta and W;

oxides of Ti, Si, Zn, Sn, In, Zr, Al, Cr, Nb, Mo, Hf, Ta and W;

nitrides of Ti, Si, Zn, Sn, In, Zr, Al, Cr, Nb, Mo, Hf, Ta and W; and mixtures thereof.

20. The method according to claim 19, wherein the scratch propagation blocker layer consists of unavoidable impurities and a material selected from the group consisting of Ti, Si, Zn, Sn, In, Zr, Al, Cr, Nb, Mo, Hf, Ta and W;

oxides of Ti, Si, Zn, Sn, In, Zr, Al, Cr, Nb, Mo, Hf, Ta and W;

nitrides of Ti, Si, Zn, Sn, In, Zr, Al, Cr, Nb, Mo, Hf, Ta and W; and mixtures thereof.

21. The method according to claim 19, wherein the scratch propagation blocker layer has a thickness of from 2 to 8 nm.

22. A method of making a transparent article, the method comprising providing a substrate having an optical coating including furthest from the substrate a homogeneous outermost layer comprising silicon nitride; and forming a scratch propagation blocker layer on the outermost layer, wherein the scratch propagation blocker layer is a homogeneous layer comprising a material selected from the group consisting of Ti, Si, Zn, Sn, In, Zr, Al, Cr, Nb, Mo, Hf, Ta and W;

oxides of Ti, Si, Zn, Sn, In, Zr, Al, Cr, Nb, Mo, Hf, Ta and W;

nitrides of Ti, Si, Zn, Sn, In, Zr, Al, Cr, Nb, Mo, Hf, Ta and W; and mixtures thereof.

23. The method according to claim 22, wherein the outermost layer comprises amorphous silicon nitride.

24. The method according to claim 22, wherein the forming comprises vapor depositing the scratch propagation blocker layer on the outermost layer.

25. The method according to claim 22, wherein the scratch propagation blocker layer comprises a material selected from the group consisting of $TiO_2$, $SiO_2$, ZnO, $SnO_2$, $In_2O_3$, $ZrO_2$, $Al_2O_3$, $Cr_2O_3$, $Nb_2O_5$, $MoO_3$, $HfO_2$, $Ta_2O_5$, $WO_3$ and mixtures thereof; and the forming comprises depositing on the outermost layer a metal, a metal suboxide or a metal subnitride diffusion barrier layer comprising at least one element selected from the group consisting of Ti, Si, Zn, Sn, In, Zr, Al, Cr, Nb, Mo, Hf, Ta and W;

heating the diffusion barrier layer in an atmosphere containing oxygen; and reacting the diffusion barrier layer with the oxygen to form the scratch propagation blocker layer.

26. The method according to claim 25, wherein the diffusion barrier layer has a thickness of from 2 nm to 8 nm.

27. The method according to claim 25, wherein the atmosphere containing oxygen is air.

28. The method according to claim 25, wherein the heating comprises raising a temperature of the optical coating to at least 400° C.

29. The method according to claim 25, wherein the heating tempers the optical coating.

30. The method according to claim 25, wherein the heating tempers the substrate.

31. The method according to claim 25, further comprising depositing a layer consisting essentially of carbon on the diffusion barrier layer before heating the diffusion barrier layer; and reacting the layer consisting essentially of carbon with the oxygen to form a carbon containing gas.

32. The method according to claim 31, wherein the carbon containing gas comprises at least one compound selected from the group consisting of carbon monoxide and carbon dioxide.

33. The method according to claim 22, wherein the substrate comprises a glass.

34. The method according to claim 33, wherein the glass is transparent to visible light.

* * * * *

UNITED STATES PATENT AND TRADEMARK OFFICE
CERTIFICATE OF CORRECTION

PATENT NO.   : 6,770,321 B2
DATED        : August 3, 2004
INVENTOR(S)  : Kyle W. Hukari et al.

It is certified that error appears in the above-identified patent and that said Letters Patent is hereby corrected as shown below:

Column 6,
Line 49, "Sno$_2$," should read -- SnO$_2$, --.

Signed and Sealed this

Eighteenth Day of January, 2005

JON W. DUDAS
*Director of the United States Patent and Trademark Office*